(12) United States Patent
Madsen

(10) Patent No.: US 11,135,741 B2
(45) Date of Patent: Oct. 5, 2021

(54) METHOD OF MANUFACTURING A WIND TURBINE ROTOR BLADE

(71) Applicant: LM WIND POWER US TECHNOLOGY APS, Kolding (DK)

(72) Inventor: Kristian Lehmann Madsen, Fredericia (DK)

(73) Assignee: LM WIND POWER US TECHNOLOGY APS, Kolding (DK)

(*) Notice: Subject to any disclaimer, the term of this patent is extended or adjusted under 35 U.S.C. 154(b) by 60 days.

(21) Appl. No.: 16/482,759

(22) PCT Filed: Feb. 6, 2018

(86) PCT No.: PCT/EP2018/052959
§ 371 (c)(1),
(2) Date: Aug. 1, 2019

(87) PCT Pub. No.: WO2018/146095
PCT Pub. Date: Aug. 16, 2018

(65) Prior Publication Data
US 2019/0351584 A1 Nov. 21, 2019

(30) Foreign Application Priority Data
Feb. 8, 2017 (EP) .................. 17155189

(51) Int. Cl.
*B29B 11/16* (2006.01)
*B29L 31/08* (2006.01)
(Continued)

(52) U.S. Cl.
CPC ............ *B29B 11/16* (2013.01); *B29C 70/443* (2013.01); *B29K 2101/12* (2013.01); *B29K 2309/08* (2013.01); *B29L 2031/085* (2013.01)

(58) Field of Classification Search
CPC .......... F16C 33/64; F16C 19/36; F16C 19/44; F16C 2202/04; B21D 22/20; B21D 24/16;
(Continued)

(56) References Cited

U.S. PATENT DOCUMENTS 5,727,357 A * 3/1998 Arumugasaamy ..... D07B 1/025
428/377
8,348,618 B2 * 1/2013 Hartman ................. B60L 53/30
416/210 R
(Continued)

FOREIGN PATENT DOCUMENTS

EP 2881237 A1 6/2015

*Primary Examiner* — Lawrence Averick
(74) *Attorney, Agent, or Firm* — Nath, Goldberg & Meyer; Jerald L. Meyer; Tanya E. Harkins

(57) ABSTRACT

The present invention relates to a method of manufacturing a wind turbine rotor blade, to a wind turbine rotor blade obtainable by said method, to a pultrusion process for producing an elongated preform (97) for embedment in a wind turbine rotor blade and to an elongated preform (97) obtainable by said process. The blade manufacturing process involves a pultrusion process to obtain the preform (97), embedding the preform (97) within one or more parts of the blade, infusing a resin into said one or more blade parts containing the preform (97), and assembling the rotor blade including said one or more blade parts.

18 Claims, 4 Drawing Sheets

Figure 1:
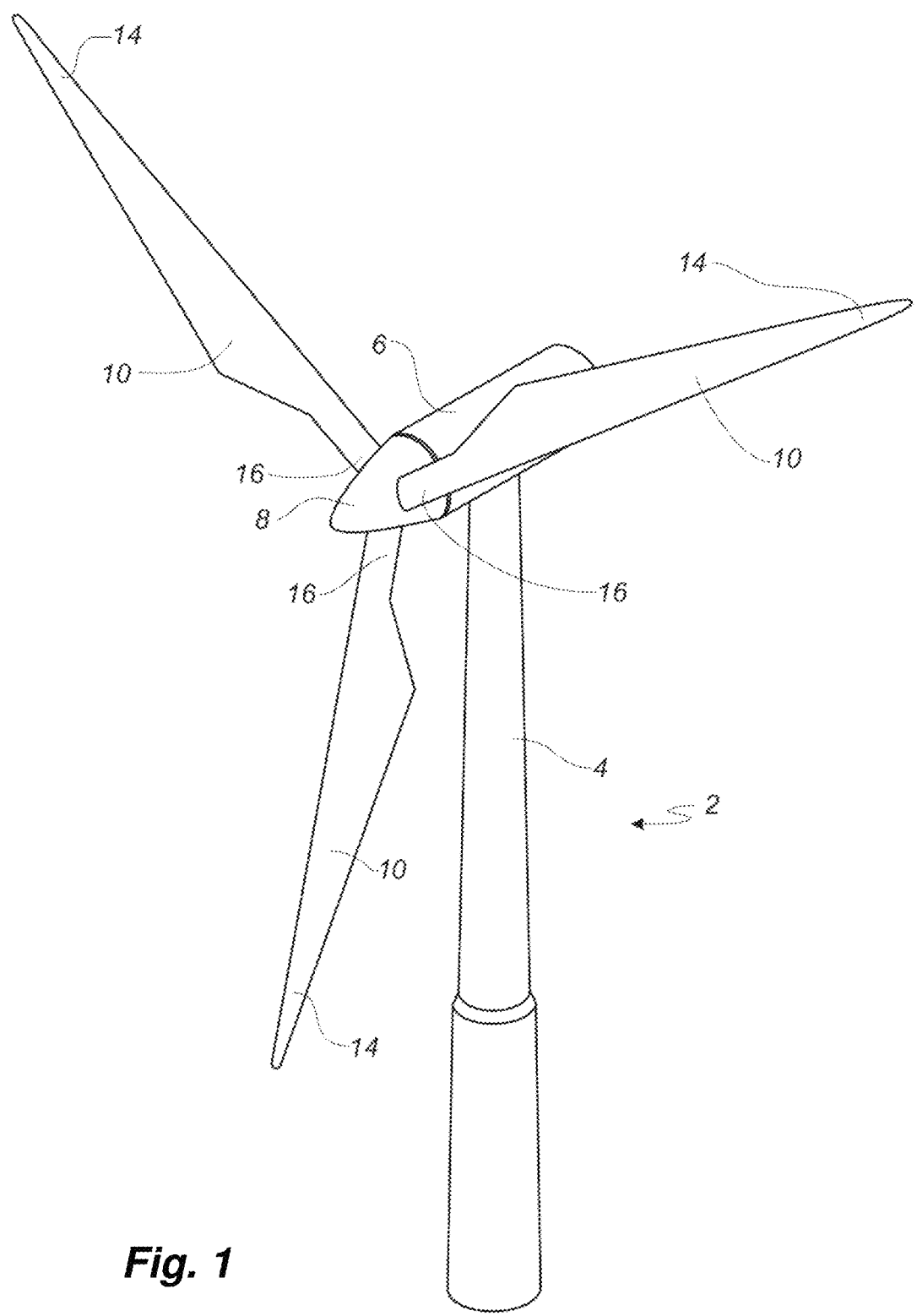

(51) Int. Cl.
*B29C 70/44* (2006.01)
*B29K 101/12* (2006.01)
*B29K 309/08* (2006.01)

(58) Field of Classification Search
CPC ........ B21D 28/02; B21D 53/10; B21D 28/00; B21J 5/08; B21J 1/06; C21D 1/18; C21D 1/76; C21D 9/40
See application file for complete search history.

(56) References Cited

U.S. PATENT DOCUMENTS

| | | | |
|---|---|---|---|
| 9,593,238 B2* | 3/2017 | Arai | C08J 5/24 |
| 9,831,029 B2* | 11/2017 | Yanagawa | H01F 38/14 |
| 10,105,913 B2* | 10/2018 | Sandercock | F03D 1/0675 |
| 2010/0226775 A1* | 9/2010 | Hartman | B60L 53/31 |
| | | | 416/131 |
| 2011/0048624 A1 | 3/2011 | Nitsch | |
| 2014/0306547 A1* | 10/2014 | Yanagawa | H01F 38/14 |
| | | | 307/104 |
| 2015/0233260 A1* | 8/2015 | Garm | F03D 80/70 |
| | | | 416/204 A |
| 2015/0252184 A1* | 9/2015 | Arai | C08L 63/00 |
| | | | 523/434 |
| 2015/0316027 A1* | 11/2015 | Sandercock | B29C 70/546 |
| | | | 416/230 |
| 2017/0058869 A1* | 3/2017 | Caruso | F03D 1/0675 |

\* cited by examiner

METHOD OF MANUFACTURING A WIND TURBINE ROTOR BLADE

This is a National Phase Application filed under 35 U.S.C. 371 as a national stage of PCT/EP2018/052959, filed Feb. 6, 2018, an application claiming the benefit of Chinese Application No. 17155189.8, filed Feb. 8, 2017, the content of each of which is hereby incorporated by reference in its entirety.

FIELD OF THE INVENTION

The present invention relates to a method of manufacturing a wind turbine rotor blade, to a wind turbine rotor blade obtainable by said method, to a pultrusion process for producing an elongated preform for embedment in a wind turbine rotor blade and to an elongated preform obtainable by said process.

BACKGROUND OF THE INVENTION

Wind power is becoming increasingly popular in view of its clean and environmentally friendly production of energy. The rotor blades of modern wind turbines capture kinetic wind energy by using sophisticated blade design created to maximise efficiency. Turbine blades may today exceed 80 metres in length and 4 metres in width. The blades are typically made from a fibre-reinforced polymer material and comprise a pressure side shell half and a suction side shell half. The cross-sectional profile of a typical blade includes an airfoil for creating an air flow leading to a pressure difference between both sides. The resulting lift force generates torque for producing electricity.

The shell halves of wind turbine blades are usually manufactured using moulds. First, a blade gel coat or primer is applied to the mould. Subsequently, fibre reinforcement and/or fabrics are placed into the mould followed by resin infusion. A vacuum is typically used to draw epoxy resin material into a mould. Alternatively, prepreg technology can be used in which a fibre or fabric pre-impregnated with resin forms a homogenous material which can be introduced into the mould. Several other moulding techniques are known for manufacturing wind turbine blades, including compression moulding and resin transfer moulding. The shell halves are assembled by being glued or bolted together substantially along a chord plane of the blade.

For increasing mechanical stability, wind turbine blades are often manufactured according to one of two constructional designs, namely a design where a thin aerodynamic shell is glued or otherwise bonded onto a spar beam, or a design where spar caps, also called main laminates, are integrated into the aerodynamic shell.

In the first design, the spar beam constitutes the load bearing structure of the blade. The spar beam as well as the aerodynamic shell or shell parts are manufactured separately. The aerodynamic shell is often manufactured as two shell parts, typically as a pressure side shell part and a suction side shell part. The two shell parts are glued or otherwise connected to the spar beam and are further glued to each other along a leading edge and trailing edge of the shell parts. This design has the advantage that the critical load carrying structure may be manufactured separately and therefore is easier to control. Further, this design allows for various different manufacturing methods for producing the beam, such as moulding and filament winding.

In the second design, the spar caps or main laminates are integrated into the shell and are moulded together with the aerodynamic shell. The main laminates typically comprise a high number of fibre layers compared to the remainder of the blade and may form a local thickening of the wind turbine shell, at least with respect to the number of fibre layers. Thus, the main laminate may form a fibre insertion in the blade. In this design, the main laminates constitute the load carrying structure. The blade shells are typically designed with a first main laminate integrated in the pressure side shell part and a second main laminate integrated in the suction side shell part. The first main laminate and the second main laminate are typically connected via one or more shear webs, which for instance may have a C-shaped or I-shaped cross-section. For very long blades, the blade shells may further along at least a part of the longitudinal extent comprise an additional first main laminate in the pressure side shell, and an additional second main laminate in the suction side shell. These additional main laminates may also be connected via one or more shear webs. This design has the advantage that it is easier to control the aerodynamic shape of the blade via the moulding of the blade shell part.

The shear webs act to reinforce the blade structure, and prevent excessive bending or buckling. Some blade designs use shear webs formed from beam members having I- or C-shaped cross-sections, the members having a main body with load-bearing flanges extending therefrom at opposed ends of the main body. In the manufacturing of shear webs, typically one or more inserts are embedded in the fibre structure, the inserts being adapted to provide a gradual transition from the web body to the web foot flanges.

It is a first object of the present invention to provide a method of manufacturing wind turbine blades which includes a simple, flexible and cost-effective manufacturing and subsequent use of parts used therein.

It is a further object of the present invention to provide such parts having sufficient mechanical stability and elasticity.

SUMMARY OF THE INVENTION

The present inventors have found that one or more of said objects may be achieved by a method of manufacturing a wind turbine rotor blade, said method comprising the step of
  manufacturing an elongated preform having a length of at least 1 meter and a constant cross section, wherein the preform is manufactured using a pultrusion process comprising the steps of
    providing a fibre material such as fibre rovings,
    contacting the fibre material with a heated binding agent to form a pultrusion string, wherein the binding agent is present in an amount of 0.1-15 wt % relative to the weight of the fibre material,
    pulling the pultrusion string through a die having a predetermined cross section, and
    cutting the pultrusion string to obtain the preform,
  wherein said method of manufacturing a wind turbine rotor blade further comprises the steps of
    embedding the preform within one or more parts of the blade,
    infusing a resin into said one or more blade parts containing the preform, and
    assembling the rotor blade including said one or more blade parts.

It has been found by the present inventors that such preforms are mechanically stable, yet sufficiently flexible and elastic to allow for convenient further processing by way of subsequent transportation, storage, embedding and/ or infusing of such preforms. In particular, it was found that the above-described pultrusion process results in preforms that are distinct from the products of some of the more traditional pultrusion processes, for example using thermosetting resins. The resulting preforms have low stiffness, but high mechanical stability. Such comparatively soft and/or elastic preforms can be bent to adapt to curved blade geometries. Also, the subsequent resin infusion step will provide the final strength to the preform contrary to some prior art approaches in which the stiffness and strength of a preform does not change during the resin infusion process when producing the blade part.

Another advantage of the present invention resides in the fact that it greatly reduces prior art problems with bonding strength between preforms and certain areas of the blade part, as is seen with some prior art pultrusion processes. In addition, the inventive preforms make any grinding or similar surface preparation obsolete as the above-described surprisingly high bonding strength is achieved. This leads to significant cost reductions and also to improved work safety since the creation of dust and waste is minimised.

In one embodiment, the obtained preform may be wound up to a coil or similar structure for storage and/or transportation prior to the subsequent embedding step.

It is preferred that said blade part is a shear web, preferably an I-shaped shear web, or a shell half. The preform may be advantageously used as insert in the manufacturing of such shear web along with other components such as fibre layers and/or core materials. Typically, such materials, including the inserts, will be arranged on or around a shear web mould, after which the materials are infused with a resin. The shear web is then usually arranged between two blade halves, which are assembled to form the wind turbine blade.

According to another embodiment, the preform has a length of at least 2 meters, more preferably 3 meters, most preferably 4 meters. In some embodiments the preform has a length of at least 5, 7, 10, 15, 20 or 25 meters. Thus, the length of the preform may range from 1 to 80 meters, such as 4-80 meters, 10-80 meters, 20-60 meters or 25-45 meters.

The preform of the present invention has a constant cross section, i.e. a uniform cross section along its entire length. According to one embodiment, the die and the resulting preform have a triangular cross section. This is particularly preferred when the preform is used as an insert for a shear web. The triangular cross section may have the shape of an euclidean triangle, a hyperbolic triangle or mixture thereof, such that one or two sides are straight and one or two sides are curved. In one embodiment, two sides are curved and one side is straight. In a preferred embodiment, the preform has the shape of a triangular prism.

Advantageously, the pultrusion string is pulled by means of a gripping tool, said gripping tool comprising one or more needles and/or pins for at least partially penetrating the pultrusion string.

According to another embodiment, the binding agent is a thermoplastic binding agent. Typically, the fibre rovings are at least partially joined together by means of the binding agent by thermal bonding. In a preferred embodiment, the binding agent is a binding powder, such as a thermoplastic binding powder.

In one embodiment, the binding agent is present in an amount of 1-15 wt %, such as 0.5-10 wt %, preferably 0.5-5 wt %, more preferably 0.5-3.5 wt % relative to the weight of the fibre material. According to a particularly preferred embodiment, the binding agent is present in an amount of 1-6 wt % relative to the weight of the fibre material. The binding agent may also comprise two or more different substances, as long as the total binding agent is present in an amount of 0.1-15 wt % relative to the weight of the fibre material.

According to another embodiment, the melting point of the binding agent is between 40° and 220° C., preferably between 40 and 180° C., such as between 40 and 170° C., preferably between 40 and 160° C.

In a preferred embodiment, the binding agent is different from the resin used for infusing said one or more blade parts. Advantageously, a resin different from the binding agent of the pultrusion process can help to increase the stiffness of the previously elastic preform upon the infusion step.

According to another embodiment, the preform has an elastic modulus (Young's modulus) of between 0.01 and 250 GPa, preferably 0.01-100 GPa, such as between 0.01-45 GPa or between 0.01-10 GPa. It is most preferred that the preform has an elastic modulus (Young's modulus) of between 0.01 and 10 GPa, preferably between 0.01 and 5 GPa, such as between 0.01 and 4 GPa, between 0.01 and 3 GPa, between 0.01 and 2 GPa, between 0.01 and 1 GPa, or between 0.01 and 0.5 GPa. Preforms with such elasticity and comparatively low stiffness were found to be particularly well suited for a blade manufacturing process according to the present invention.

According to another embodiment, the binding agent comprises a polyester, preferably a bisphenolic polyester. An example of such binding agent is a polyester marketed under the name NEOXIL 940. Examples include NEOXIL 940 PMX, NEOXIL 940 KS 1 and NEOXIL 940 HF 2B, all manufactured by DSM Composite Resins AG. Preferably, the binding agent is a polyester, preferably a bisphenolic polyester. In other embodiments, the binding agent is a hotmelt adhesive or based on a prepreg resin.

According to one embodiment, the pultrusion string comprises a first region and a second region, wherein the first region contains a higher amount of binding agent than the second region relative to the weight of the fibre material. The present inventors have found that this approach can be advantageously used to vary the local stiffness of the preform, such that, for example, a lower stiffness is achieved in the length direction and a higher stiffness is achieved in the transverse direction of the preform.

According to another embodiment, in the first region the binding agent is present at in an amount of 5-15 wt %, and wherein in the second region the binding agent is present at in an amount of 0.1-4 wt % relative to the weight of the fibre material. Preferably, in the first region the binding agent is present at in an amount of 5-10 wt %, and wherein in the second region the binding agent is present at in an amount of 1-4 wt % relative to the weight of the fibre material.

According to another embodiment, the first region constitutes less than 20% of the area of the entire cross section of the preform, such as less than 15%, less than 10% or less than 5% of the entire cross section of the preform.

It is particularly preferred that the preform has a lower stiffness prior to the step of infusing a resin into said one or more blade parts as compared to after completion of said step. In other words, the preform preferably has a lower stiffness than the corresponding form obtained after the step of infusing a resin into said one or more blade parts. For example, the preform may have a lower elastic modulus (Young's modulus) prior to the step of infusing a resin into said one or more blade parts as compared to after completion of said step. In some embodiments the preform may have an elastic modulus (Young's modulus) of 90% or less, 80% or less, 50% or less, 25% or less, 10% or less, or 5% or less prior to the step of infusing a resin into said one or more blade parts as compared to the elastic modulus (Young's modulus) of the final resin infused form within said one or more blade parts. As discussed herein, the choice of binding agent and infusion resin may assist in this regard.

In one embodiment, the preform essentially consists of the fibre material and the binding agent. This means that the preform contains not more than 10 wt %, preferably not more than 5 wt % or not more than 1 wt %, of material other than fibre material and binding agent relative to the total weight of the preform. According to another embodiment, the preform consists of the fibre material and the binding agent.

According to another embodiment, the fibre material comprises fibre rovings, preferably glass fibre rovings. The fibre material may also comprise a fibre fabric, such as a fibre mat. According to another embodiment, the fibre material comprises glass fibres. In another embodiment, the fibre material essentially consists of glass fibres. This means that the fibre material contains not more than 10 wt %, preferably not more than 5 wt % or not more than 1 wt %, of material other than glass fibres relative to the total weight of the fibre material. According to another embodiment, the fibre material consists of glass fibres.

Typically, the resin infusion step comprises vacuum assisted resin transfer moulding. In a preferred embodiment, the resin dissolves the binding agent of the preform.

The resin for injecting the preform during the manufacturing of wind turbine blade parts, such as a shear web, may be an epoxy, a polyester, a vinyl ester or another suitable thermoplastic or duroplastic material. In other embodiments, the resin may be a thermosetting resin, such as epoxy, vinyl ester or polyester, or a thermoplastic resin, such as nylon, PVC, ABS, polypropylene or polyethylene. However, the resin may comprise an in-situ polymerisable thermoplastic material. The in-situ polymerisable thermoplastic material may advantageously be selected from the group consisting of pre-polymers of: polybutylene terephthalate (PBT), polyamide-6 (pre-polymer is caprolactam), polyamide-12 (pre-polymer is laurolactam) alloys of polyamide-6 and polyamide-12; polyurethanes (TPU), polymethylmethacrylate (PMMA), polyethylene terephthalate (PET), polycarbonate (PC), polyetheretherketone (PEEK), polyetherketone (PEK), polyethersulfone (PES), polyphenylenesulphide (PPS), polyethylenenaphthalate (PEN) and polybutylenenaphthalate (PBN), cyclic poly(1,4-butylene terephthalate) (CBT) and/or combinations thereof.

In another aspect, the present invention relates to a wind turbine rotor blade obtainable by the above-described method of the present invention. Such rotor blade was found to exhibit improved structural stability.

In yet another aspect, the present invention relates to a pultrusion process for producing an elongated preform for embedment in a wind turbine rotor blade, the preform having a constant cross section and a length of at least 1 meter, the pultrusion process comprising the steps of
- contacting a fibre material with a heated binding agent to form a pultrusion string, wherein the binding agent is present in an amount of 0.1-15 wt % relative to the weight of the fibre material,
- pulling the pultrusion string through a die having a predetermined cross section,
- cutting the pultrusion string to obtain the elongated preform.

The above-described embodiments of the method of manufacturing a wind turbine blade also apply to the pultrusion process of the present invention. Specifically, according to one embodiment, the preform has a length of at least 4 meters. According to another embodiment, the die and the resulting preform have a triangular cross section. According to another embodiment, the triangular cross section has the shape of a hyperbolic triangle. According to another embodiment, the pultrusion string is pulled by means of a gripping tool, said gripping tool comprising one or more needles and/or pins for at least partially penetrating the pultrusion string. According to another embodiment, the binding agent is a thermoplastic binding agent.

In one embodiment, the binding agent is present in an amount of 1-6 wt % relative to the weight of the fibre material. According to another embodiment, the melting point of the binding agent is between 40° and 220° C., preferably between 40 and 160° C. According to another embodiment, the binding agent comprises a polyester, preferably a bisphenolic polyester. According to another embodiment, the pultrusion string comprises a first region and a second region, wherein the first region contains a higher amount of binding agent than the second region relative to the weight of the fibre material. According to another embodiment, in the first region the binding agent is present at in an amount of 5-15 wt %, and wherein in the second region the binding agent is present at in an amount of 0.1-4 wt % relative to the weight of the fibre material. According to another embodiment, the first region constitutes less than 20% of the area of the entire cross section of the preform In one embodiment, the preform essentially consists of the fibre material and the binding agent. According to another embodiment, the fibre material comprises fibre rovings, preferably glass fibre rovings. According to another embodiment, the fibre material comprises a fibre fabric, such as a fibre mat.

In another aspect, the present invention relates to an elongated preform obtainable by the afore-described method, the preform having a constant cross section and a length of at least 1 meter.

Preferably, the preform has a length of at least 2 meters, more preferably 3 meters, most preferably 4 meters. In some embodiments the preform has a length of at least 5, 7, 10, 15, 20 or 25 meters. Thus, the length of the preform may range from 1 to 80 meters, such as 4-80 meters, 10-80 meters, 20-60 meters or 25-45 meters.

In one embodiment, the preform has a triangular cross section. According to another embodiment, the triangular cross section has the shape of a hyperbolic triangle. According to another embodiment, the binding agent is a thermoplastic binding agent. In one embodiment, the binding agent is present in an amount of 1-6 wt % relative to the weight of the fibre material. According to another embodiment, the melting point of the binding agent is between 40° and 220° C., preferably between 40 and 160° C. According to another embodiment, the binding agent comprises a polyester, preferably a bisphenolic polyester.

According to another embodiment, the preform comprises a first region and a second region, wherein the first region contains a higher amount of binding agent than the second region relative to the weight of the fibre material. According to another embodiment, in the first region the binding agent is present at in an amount of 5-15 wt %, and wherein in the second region the binding agent is present at in an amount of 0.1-4 wt % relative to the weight of the fibre material. According to another embodiment, the first region constitutes less than 20% of the area of the entire cross section of the preform.

In one embodiment, the preform essentially consists of the fibre material and the binding agent. According to another embodiment, the fibre material comprises fibre rovings, preferably glass fibre rovings. According to another embodiment, the fibre material comprises a fibre fabric, such as a fibre mat.

In a preferred embodiment, the preform may further comprise at least one fibre fabric such as a fibre mat. The fibre rovings may be arranged on top and/or below such fabric.

In a preferred embodiment, the binding agent is present in an amount of 0.1-15 wt % relative to the weight of the fibre rovings. Preferably, the binding agent is present in an amount of 0.5-10 wt %, preferably 0.5-5 wt %, more preferably 0.5-3.5 wt %, relative to the weight of the fibre rovings. The binding agent may also comprise two or more different substances, as long as the total binding agent is present in an amount of 0.1-15 wt % relative to the weight of the fibre rovings.

It was found that the comparatively low amount of binding agent of 0.1-15 wt % relative to the weight of the fibre rovings provides improved flexibility as contrasted to known fibre preforms for manufacturing wind turbine blades. It was also found that this amount of binding agent results in sufficient stability for handling during the blade moulding process.

In another aspect, the present invention relates to the use of the above-described preform for manufacturing a wind turbine blade.

It will be understood that any of the above-described features may be combined in any embodiment of the inventive blade or preform as described.

The term polymerisable thermoplastic material means that the material may be polymerised once at the manufacturing site.

As used herein, the term "wt %" means weight percent. The term "relative to the weight of the fibre material" means a percentage that is calculated by dividing the weight of an agent, such as a binding agent, by the weight of the fibre material. As an example, a value of 1 wt % relative to the weight of the fibre material corresponds to 10 g of binding agent per kilogram of fibre material.

The skilled reader will understand that the elastic modulus, also known as Young's modulus, defines the relationship between stress (force per unit area) and strain (proportional deformation) in a material. Thus, the elastic modulus is a measure of the stiffness of a material. The elastic modulus can be determined by the cantilever beam test, as is well known in the art.

As used herein, the term "triangular cross section" refers to a cross section that has the shape of an euclidean or hyperbolic or any other triangle. In a hyperbolic triangle, the sum of the angles is less than 180° and the sides are curved.

As used herein, the term "elongated" denotes a three-dimensional structure with one dimension of substantially greater length than the other two dimensions. Non-limiting examples of an elongated structure include a strip, a ribbon, a sheet or a cylinder.

DETAILED DESCRIPTION OF THE INVENTION

Figure 2:
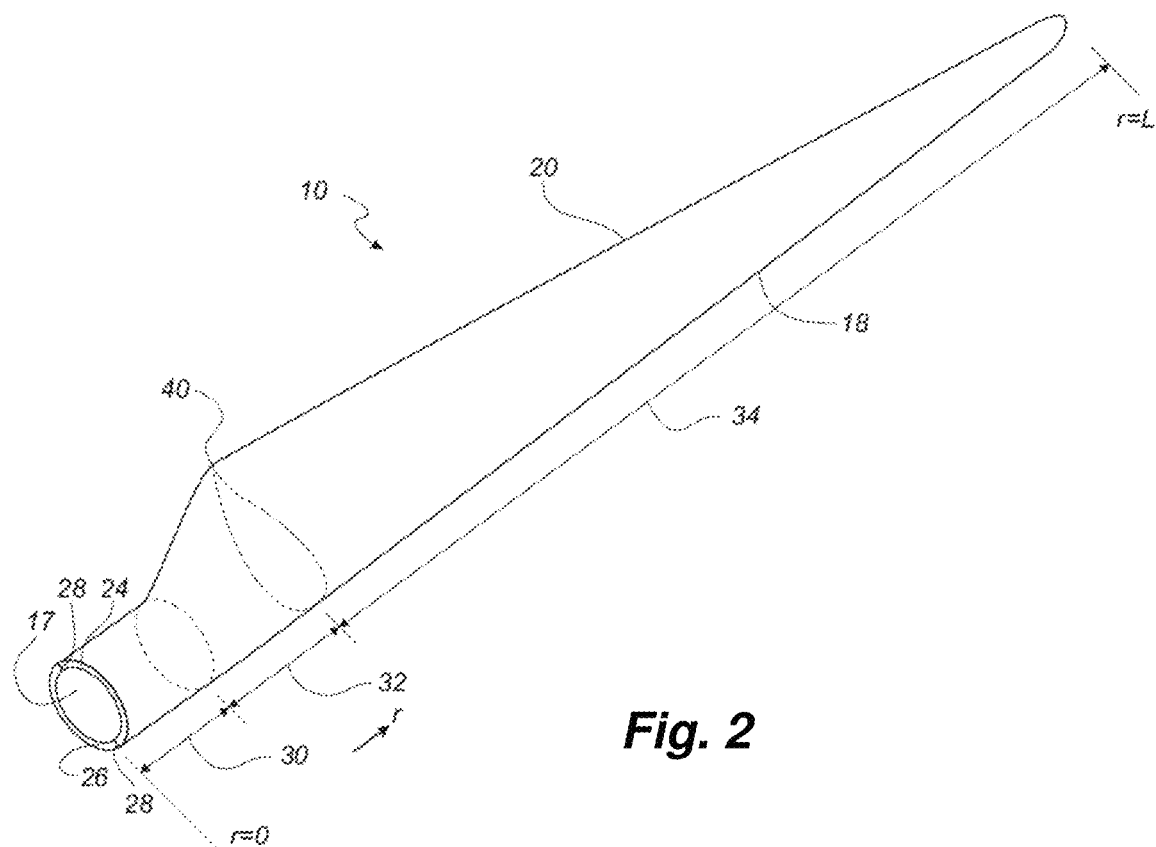
Figure 3:
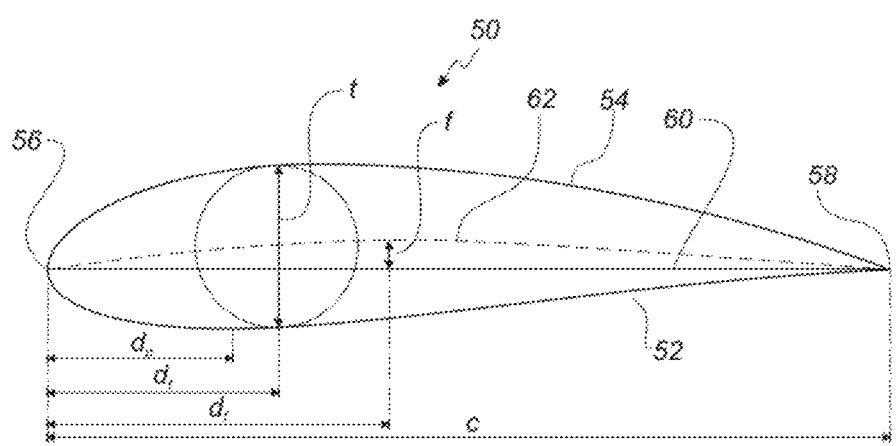
Figure 4:
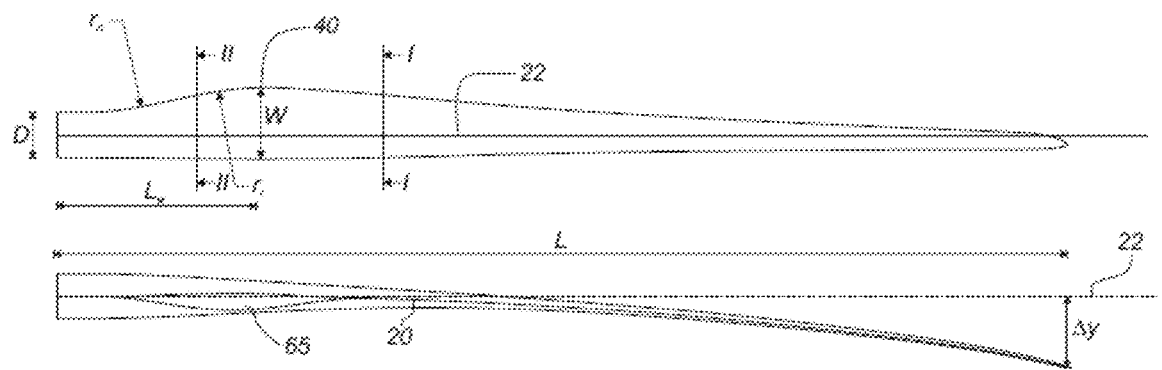
Figure 5:
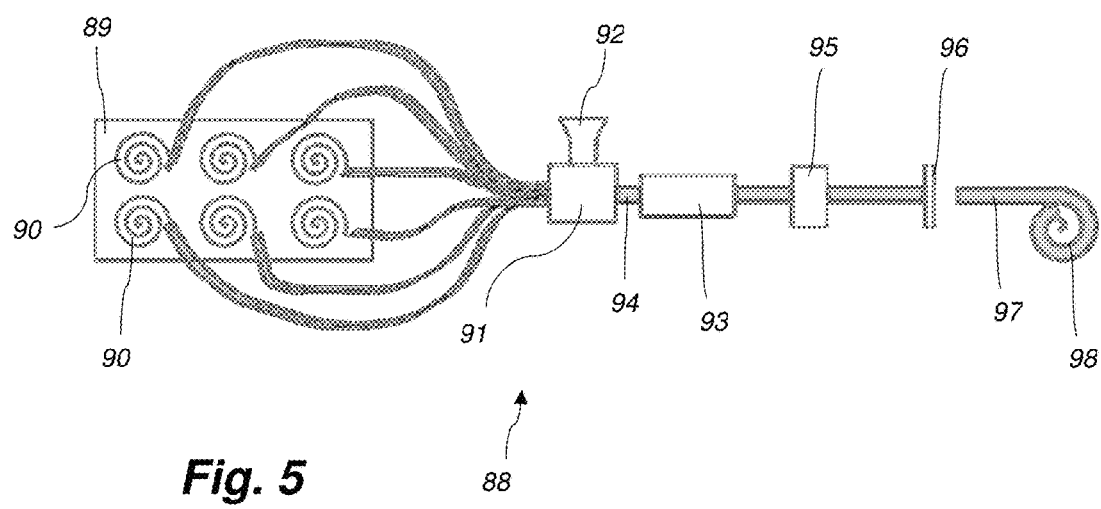
Figure 6:
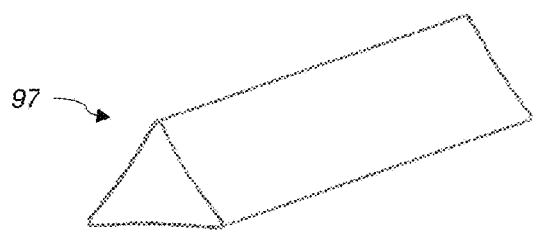
Figure 7:
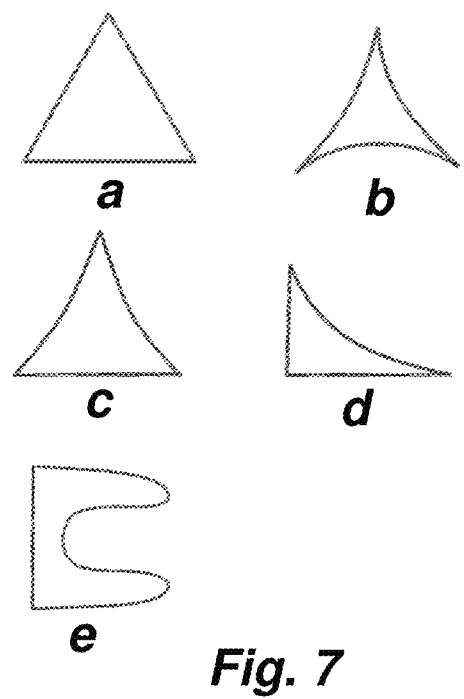
Figure 8:
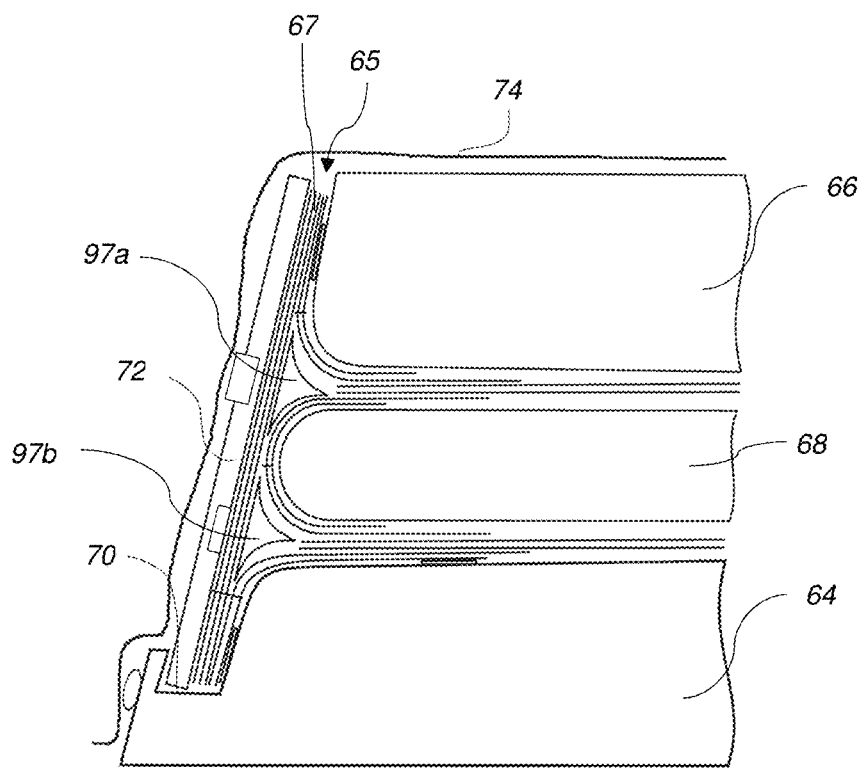

The invention is explained in detail below with reference to embodiments shown in the drawings, in which FIG. 1 shows a wind turbine, FIG. 2 shows a schematic view of a wind turbine blade, FIG. 3 shows a schematic view of an airfoil profile through section I-I of FIG. 4, FIG. 4 shows a schematic view of the wind turbine blade, seen from above and from the side, FIG. 5 is a schematic view of a pultrusion system for manufacturing an elongated preform according to the present invention, FIG. 6 is a perspective drawing of a preform according to the present invention, FIG. 7 shows different embodiments of possible cross sections of the die and the resulting preform according to the present invention, and FIG. 8 illustrates a possible use of the preform in a shear web mould as part of a blade manufacturing process.

DETAILED DESCRIPTION

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34. FIG. 2 furthers shows root end face 17, and a pressure side shell part 24 and a suction side shell part 26 that are glued together along bond lines 28, extending along the trailing edge 20 and the leading edge 18 of the blade 10.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIGS. 3 and 4 depict parameters which are used to explain the geometry of the wind turbine blade according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position r=$L_w$, and has a shoulder width W, which equals the chord length at the shoulder 40. The diameter of the root is defined as D. The curvature of the trailing edge of the blade in the transition region may be defined by two parameters, viz. a minimum outer curvature radius $r_o$ and a minimum inner curvature radius $r_i$, which are defined as the minimum curvature radius of the trailing edge, seen from the outside (or behind the trailing edge), and the minimum curvature radius, seen from the inside (or in front of the trailing edge), respectively. Further, the blade is provided with a prebend, which is defined as Δy, which corresponds to the out of plane deflection from a pitch axis 22 of the blade.

FIG. 5 schematically illustrates a pultrusion process according to the present invention. A number of bands or rovings of fibre material 90 are drawn from a shelf 89 into a receiving and heating station 91. A binding agent is fed from a reservoir 92 into the receiving and heating station 91 to provide contact with the fibre material 90, wherein the binding agent is present in an amount of 0.1-15 wt % relative to the weight of the fibre material. The resulting pultrusion string 94 is passed through a shaping die 93 which, for example, has a cross section corresponding to one of those shown in FIG. 7. Alternatively, the binder could be added to the glass material prior to this process by the glass supplier.

The string may be extracted from the die by means of a pulling station 95. On the other side of the pulling station 95 a knife 96 cuts the string, whereby an elongated preform 97 is obtained. The elongated preform 97 is flexible and soft enough for it to be wound up on a roll or coil 98 for transport and later use.

FIG. 6 is a perspective drawing of the resulting preform 97, which may have the shape of a triangular prism.

FIG. 7 illustrates a number of cross sections of the shaping die and of the resulting preform. FIG. 7 a-d each show a triangular cross sections, the triangle being defined by different combinations of straight and curved sides. FIG. 7e is an example of more complex cross section that might be useful for stabilising blade parts or elements thereof between the two extending legs of the preform.

FIG. 8 illustrates a possible use of the preform in a blade manufacturing process. Here, An I-shaped shear web 65 (only shown in part) is moulded between a lower web mould part 64 and an upper web mould part 66. Fibre layers 67 and a core material 68 are arranged between the lower web mould parts 64, 66. The lower web mould part 64 is provided with a ledge 70, for defining an end section of the first side of the web foot flange and/or may be used for carrying the external web foot flange. Further, a first and a second preform 97a, 97b according to the present invention are arranged within the mould. The preforms may have a shape so as to provide a gradual transition from the web body to a web foot flange. A backing plate 72 is installed and subsequently a vacuum bag 74 is arranged on top of the two web mould parts 64, 66 and the backing plate 72. Resin is then injected and finally hardened or cured in order to form the shear web.

The invention is not limited to the embodiments described herein, and may be modified or adapted without departing from the scope of the present invention.

LIST OF REFERENCE NUMERALS 2 wind turbine
4 tower
6 nacelle
8 hub
10 blade
14 blade tip
16 blade root
18 leading edge
20 trailing edge
22 pitch axis
30 root region
32 transition region
34 airfoil region
40 shoulder/position of maximum chord
50 airfoil profile
52 pressure side
54 suction side
56 leading edge
58 trailing edge
60 chord
62 camber line/median line
64 lower web mould part
65 shear web
66 upper web mould part
67 fibre material
68 core material
70 ledge
72 backing plate
74 vacuum bag 88 pultrusion system
89 shelf
90 bands of fibre material
91 receiving and heating station
92 agent reservoir
93 shaping die
94 pultrusion string
95 pulling station
96 knife
97 preform
98 coil
c chord length
$d_t$ position of maximum thickness
$d_f$ position of maximum camber
$d_p$ position of maximum pressure side camber
f camber
L blade length
r local radius, radial distance from blade root
t thickness
Δy prepend

The invention claimed is:

1. A method of manufacturing a wind turbine rotor blade, said method comprising the steps of:
   manufacturing an elongated preform (97) having a length of at least 1 meter and a constant cross section, wherein the preform (97) is manufactured using a pultrusion process comprising the steps of:
   providing a fibre material;
   contacting the fibre material with a heated binding agent to form a pultrusion string (94), wherein the binding agent is present in an amount of 0.1-15 wt % relative to the weight of the fibre material;
   pulling the pultrusion string (94) through a die (93) having a predetermined cross section; and
   cutting the pultrusion string (94) to obtain the preform (97),
   wherein said method of manufacturing a wind turbine rotor blade further comprises the steps of:
   embedding the preform (97) within one or more parts of the blade;
   infusing a resin into said one or more blade parts containing the preform (97); and
   assembling the rotor blade including said one or more blade parts, wherein said one or more blade parts comprise a shear web.

2. The method according to claim 1, wherein the preform (97) has a length of at least 4 meters.

3. The method according to claim 1, wherein the die (93) and the resulting preform (97) have a triangular cross section.

4. The method according to claim 1, wherein the binding agent is a thermoplastic binding agent.

5. The method according to claim 1, wherein the binding agent is present in an amount of 1-6 wt % relative to the weight of the fibre material.

6. The method according to claim 1, wherein the binding agent is different from the resin used for infusing said one or more blade parts.

7. The method according to claim 1, wherein the preform (97) has an elastic modulus (Young's modulus) of between 0.01 and 10 GPa.

8. The method according to claim 7, wherein the elastic modulus (Young's modulus) is between 0.01 and 5 GPa.

9. The method according to claim 1, wherein the binding agent comprises a polyester.

10. The method according to claim 9, wherein the polyester comprises a bisphenolic polyester.

11. The method according to claim 1, wherein the pultrusion string (94) comprises a first region and a second region, wherein the first region contains a higher amount of binding agent than the second region relative to the weight of the fibre material.

12. The method according to claim 11, wherein in the first region the binding agent is present at in an amount of 5-15 wt %, and wherein in the second region the binding agent is present at in an amount of 0.1-4 wt % relative to the weight of the fibre material.

13. The method according to claim 1, wherein the preform (97) has a lower stiffness prior to the step of infusing a resin into said one or more blade parts as compared to after completion of said step.

14. A wind turbine rotor blade manufactured according to the method of claim 1.

15. The method according to claim 1, wherein the fibre material comprises fibre rovings.

16. The method according to claim 1, wherein the shear web comprises an I-shaped shear web.

17. A pultrusion process for producing an elongated preform (97) for embedment in a wind turbine rotor blade, the preform (97) having a constant cross section and a length of at least 1 meter, the pultrusion process comprising the steps of:
   contacting a fibre material with a heated binding agent to form a pultrusion string (94), wherein the binding agent is present in an amount of 0.1-15 wt % relative to the weight of the fibre material;
   pulling the pultrusion string (94) through a die (93) having a predetermined cross section; and
   cutting the pultrusion string (94) to obtain the elongated preform (97).

18. An elongated preform (97) manufactured according to the method of claim 17.

* * * * *